United States Patent [19]
Pyles et al.

[11] Patent Number: 5,156,244
[45] Date of Patent: * Oct. 20, 1992

[54] TORQUE SENSING AUTOMATIC SHUT-OFF AND RESET CLUTCH FOR SCREWDRIVERS, NUTSETTERS AND THE LIKE

[75] Inventors: Douglas E. Pyles; Phil D. Thorp; Ward W. Harvey, all of Bryan, Ohio

[73] Assignee: The ARO Corporation, Bryan, Ohio

[*] Notice: The portion of the term of this patent subsequent to Oct. 8, 2008 has been disclaimed.

[21] Appl. No.: 608,985

[22] Filed: Oct. 31, 1990

Related U.S. Application Data

[63] Continuation-in-part of Ser. No. 576,283, Aug. 31, 1990, Pat. No. 5,054,588.

[51] Int. Cl.$^5$ .................. F16D 43/20; B25B 23/14
[52] U.S. Cl. .................. 192/0.034; 173/178; 192/56 R; 192/110 B; 192/150
[58] Field of Search .......... 192/0.034, 56 R, 150, 192/110 B; 173/12

[56] References Cited

U.S. PATENT DOCUMENTS

| | | | |
|---|---|---|---|
| 3,115,230 | 12/1963 | Creighton et al. | 192/56 R |
| 3,766,990 | 10/1973 | Eckman et al. | 173/12 |
| 4,071,092 | 1/1978 | Wallace | 173/12 |
| 4,154,308 | 5/1979 | Goldsberry et al. | 173/12 |
| 4,844,177 | 7/1989 | Robinson et al. | 173/12 |
| 4,880,064 | 11/1989 | Willoughby et al. | 173/12 |
| 5,054,588 | 10/1991 | Thorp et al. | 173/12 X |
| 5,060,771 | 10/1991 | Robinson | 173/12 X |

*Primary Examiner*—Rodney H. Bonck
*Attorney, Agent, or Firm*—Allegretti & Witcoff, Ltd.

[57] ABSTRACT

An improved torque control and fluid shut-off mechanism for a fluid operated tool includes a driving clutch member and a driven bit holder connected by ball bearings retained by the clutch member which engages in pockets in the bit holder. The pockets include a specific ramp construction which insures that the threshold torque level of the tool in the forward direction is less than the threshold level in the reverse direction.

9 Claims, 4 Drawing Sheets

TORQUE SENSING AUTOMATIC SHUT-OFF AND RESET CLUTCH FOR SCREWDRIVERS, NUTSETTERS AND THE LIKE

CROSS REFERENCE TO RELATED APPLICATION

This is a continuation-in-part application of application, Ser. No. 07/576,283, filed on Aug. 31, 1990, now U.S. Pat. No. 5,054,588, entitled, IMPROVED TORQUE SENSING AUTOMATIC SHUT-OFF AND RESET CLUTCH FOR SCREWDRIVERS, NUTSETTERS AND THE LIKE.

BACKGROUND OF THE INVENTION

This invention relates to an improved torque controlled fluid shut-off and reset mechanism for a fluid operated tool.

Fluid operated tools for driving fasteners and the like typically incorporate a rotary vane air motor to drive a rotary shaft connected to a tool bit. Such tools are often equipped with a clutch mechanism that responds to the torque imparted by the tool to the fastener. When a specific torque is reached, the clutch mechanism automatically decouples the motor from the tool bit and terminates further tool output to the fastener. In such tools, starting the tool is often effected by positioning the tool bit against the fastener and axially translating the bit holder by pushing it against the fastener. Axial translation then opens a fluid valve to start the air motor for the tool.

Combining a start-up control, torque control as well as a shut-off control mechanism in a single tool is a desirable goal and various tools include such combinations. Patents which disclose devices of this general nature include U.S. Pat. No. 4,576,270 issued Mar. 18, 1986, for a "Torque Control and Fluid Shut-off Mechanism For a Fluid Operated Tool" and U.S. Pat. No. 4,880,064, entitled "Torque Sensing Automatic Shut-off And Reset Clutch For Screwdrivers, Nutsetters and The Like", issued on Nov. 14, 1989. U.S. Pat. No. 4,880,064 is incorporated herewith by reference. This patent teaches the use of a torque control and fluid shut-off mechanism for a fluid operated tool which includes a bit holder and a driving clutch member which are connected so as to uniformly and co-jointly move in an axial direction independent of rotary movement associated with rotary output of a fluid or air motor. Spring biased ball bearings connect the driving clutch members and bit holder and thereby provide for co-joint rotary movement. The driving clutch member and bit holder disengage when the spring biasing force associated with the driving clutch member is exceeded by the torque of the tool so as to cause the ball bearings to disengage from the bit holder. Such disengagement actuates a locking sleeve on the driving clutch member and permits release of a valve control rod that controls the fluid inlet valve to the rotary vane air motor. This arrangement controls initiation of operation, termination of operation and resetting of the tool.

The present invention comprises an improvement with respect to the subject matter of U.S. Pat. No. 4,880,064. More specifically the present invention relates to an improved construction of the ball bearing connection between the driving and driven clutch members and other improved features.

SUMMARY OF THE INVENTION

Briefly, the present invention relates to a fluid powered, rotary output tool that is useful as a screwdriver, nut runner or the like. The tool includes a housing which encloses a fluid driven motor, typically an air vane, rotary motor. The motor, either directly or through a transmission, drives a rotary output shaft. The shaft defines a center line axis for the tool. A fluid inlet to the motor is arranged on that axis and provides a passage for pressurized air to operate the motor. A valve member positioned in the fluid inlet passage controls the pressurized fluid flow to the motor. The valve member is responsive to a torque sensitive clutch mechanism and moves to the open or closed positions in response to the torque sensing capability of the clutch mechanism.

The tool includes a bit holder at the forward end of the tool which is aligned axially with the motor output shaft. The clutch mechanism is positioned intermediate the output shaft of the air motor and the bit holder. Thus, the motor output shaft, the bit holder and the clutch mechanism are all substantially co-axial and are retained within the housing for the tool so that they can all rotate together for purposes of operation of the tool as a screwdriver or the like.

The invention specifically relates to the particular construction of the clutch mechanism. As previously mentioned, U.S. Pat. No. 4,880,064 discloses a similar torque sensing, clutch mechanism. The present invention comprises an improvement thereover.

Thus, the improved clutch mechanism includes a driving clutch member which is coupled to the output shaft of the air motor or a gear train intermediate the motor and the driving clutch member. Connection of the driving clutch member to the bit holder is effected by means of spherical ball bearings retained by the driving clutch member and extending into pockets in the bit holder. The clutch member, which is coupled to the bit holder, is designed to disengage from the bit holder at a threshold torque so as to permit rotation of the clutch member with respect to the bit holder. Normally, therefore, the bearings are retained by the clutch member so as to engage with the pockets associated with the bit holder. During normal operation of the tool, rotary output of the driving clutch member is imparted to the bit holder and thus to the fastener as a result of the described driving engagement of the roller members or bearings in the bit holder pockets.

The pockets have a particular configuration including a planar bottom section, an inclined ramp and a rib or ridge separating adjacent pockets. The roller members move along the shaped surface defined in the pockets upward along the ramp to effect axial movement of the clutch member and thereby ultimately release the air supply valve so that the air supply to the air motor is terminated. The roller members thus move to a position to effect disengagement of the clutch member from the bit holder and simultaneously, through a series of washers, ball bearings and rods, cause the air motor valve to close. The specific mechanism for terminating fluid flow to the motor is similar to that shown in U.S. Pat. No. 4,880,064 which is incorporated herewith by reference. Improvements thereto include a biasing means associated with a control rod so as to impart a uniform biasing force on the rod and thereby increase the stability of the operation of the air tool. Also, the particular configuration of the pockets constitute, in part and in combination, the subject matter of the invention.

Thus, it is an object of the invention to provide an improved torque responsive fluid powered tool which terminates torque drive output from the tool upon reaching a torque threshold level.

Another object of the invention is to provide an improved torque responsive fluid powered tool wherein the tool bit is translated axially in order to initiate operation of the tool by opening the fluid control valve to the air motor for the tool and further wherein the fluid control valve to the air motor for the tool is closed in response to a threshold torque.

It is a further object of the invention to provide an improved torque responsive fluid powered tool wherein sensing of the torque threshold is effected by cooperative interaction of a driving clutch member interconnected with a bit holder by means of biased roller members which cooperate with a ramp in one of the bit holder or driving clutch member, the ramp having a particular shape and configuration to enhance control.

Yet another object of the invention is to provide an improved torque responsive fluid powered tool wherein sensing a torque threshold by a cooperative driving member and a bit holder or driven member also acts to release a fluid inlet control valve, thereby shutting off fluid supply to the motor.

A further object of the invention is to provide an improved torque responsive fluid powered tool which automatically terminates operation of the tool upon reaching a threshold level of torque and which is resettable upon termination of fluid supply to the motor of the tool following mechanical release of the tool from the fastener upon which the tool has been operating.

These and other objects, advantages and features of the invention will be set forth in the detailed description which follows.

BRIEF DESCRIPTION OF THE DRAWING

In the detailed description which follows, reference will be made to the drawing comprised of the following FIGURES.

DESCRIPTION OF THE PREFERRED EMBODIMENT

General Construction

Figure 1:
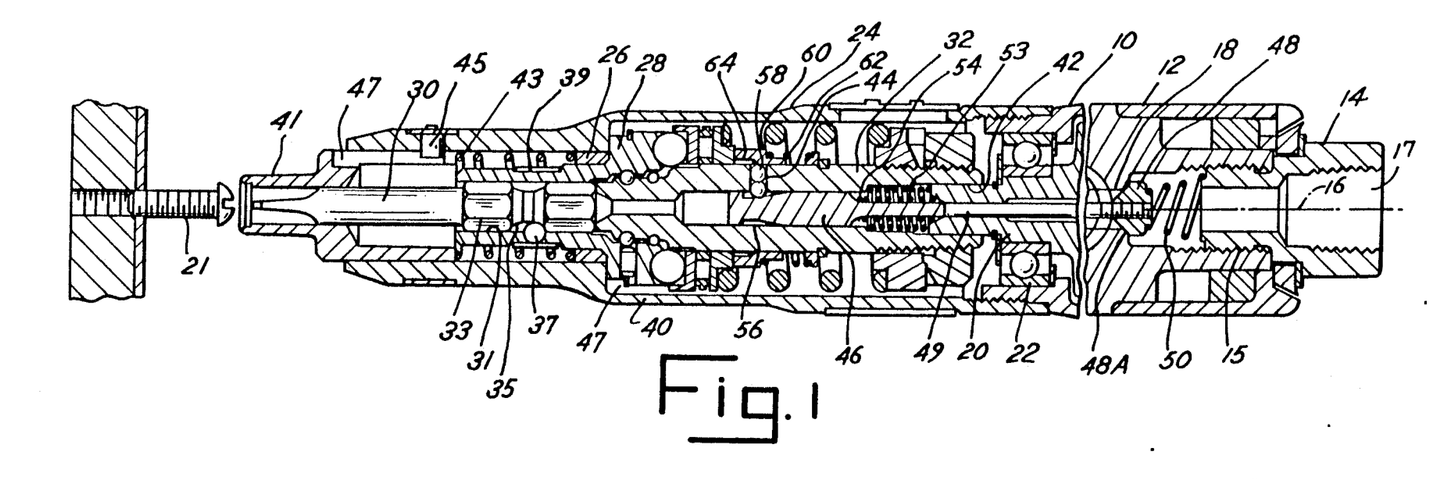
FIG. 1 is a longitudinal cross-sectional view of a rotary vane air motor driven fastening tool incorporating the subject matter of the present invention prior to positioning the tool on a fastener.
Figure 2:
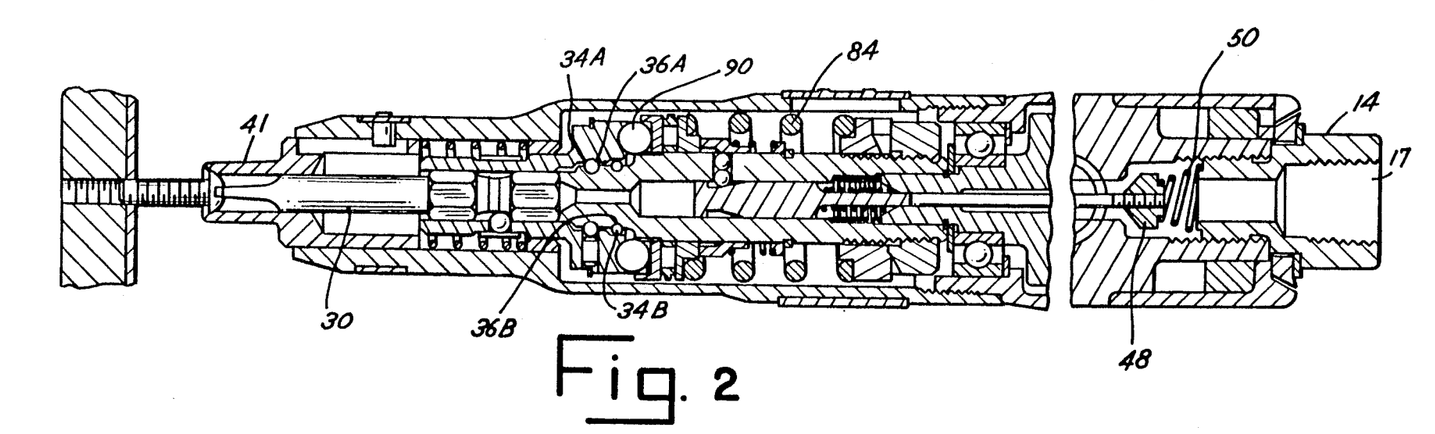
FIG. 2 is a longitudinal cross-sectional view similar to FIG. 1 wherein the tool has been positioned against a fastener so as to initiate operation of the tool.
Figure 3:
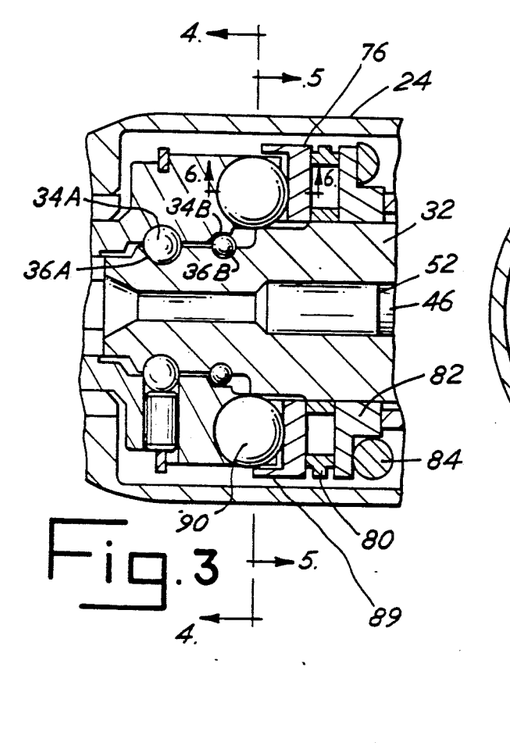
FIG. 3 is an enlarged cross-sectional view of the clutch mechanism as depicted in FIG. 2.
Figure 4:
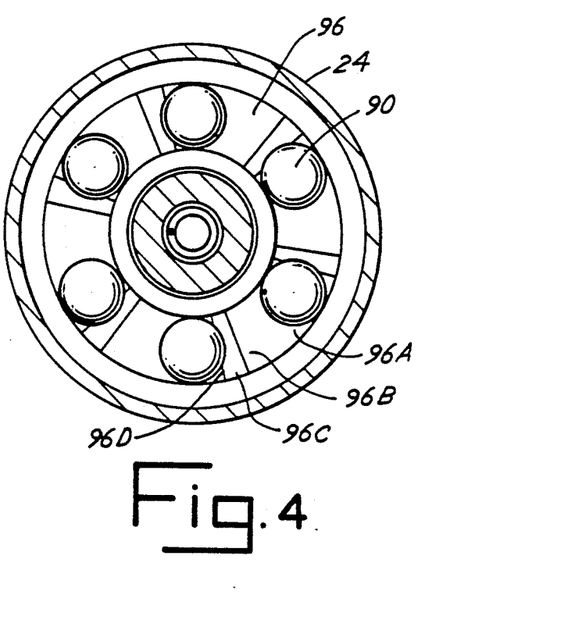
FIG. 4 is a transverse cross-sectional view taken along the line 4—4 in FIG. 3.
Figure 5:
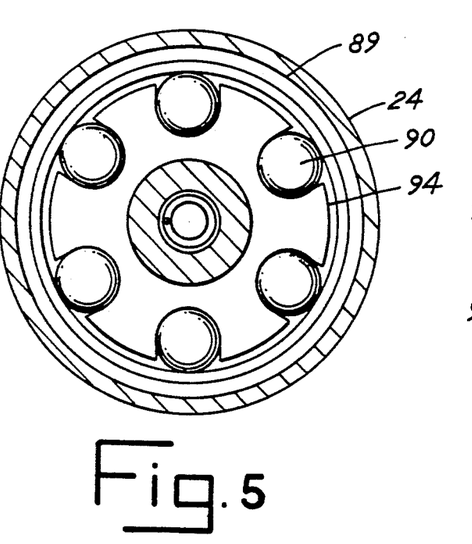
FIG. 5 is a transverse cross-sectional view taken along the line 5—5 in FIG. 3.
Figure 7:
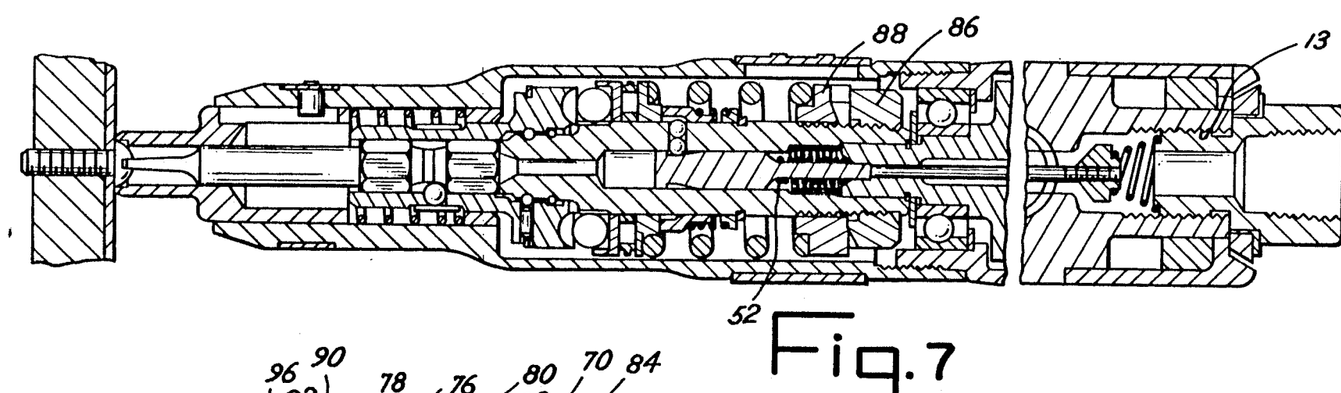
FIG. 7 is a longitudinal cross-sectional view of the tool as the clutch mechanism has become operative to initiate the beginning or the release of the valve to close the rotary air motor.
Figures 10, 11, 12:
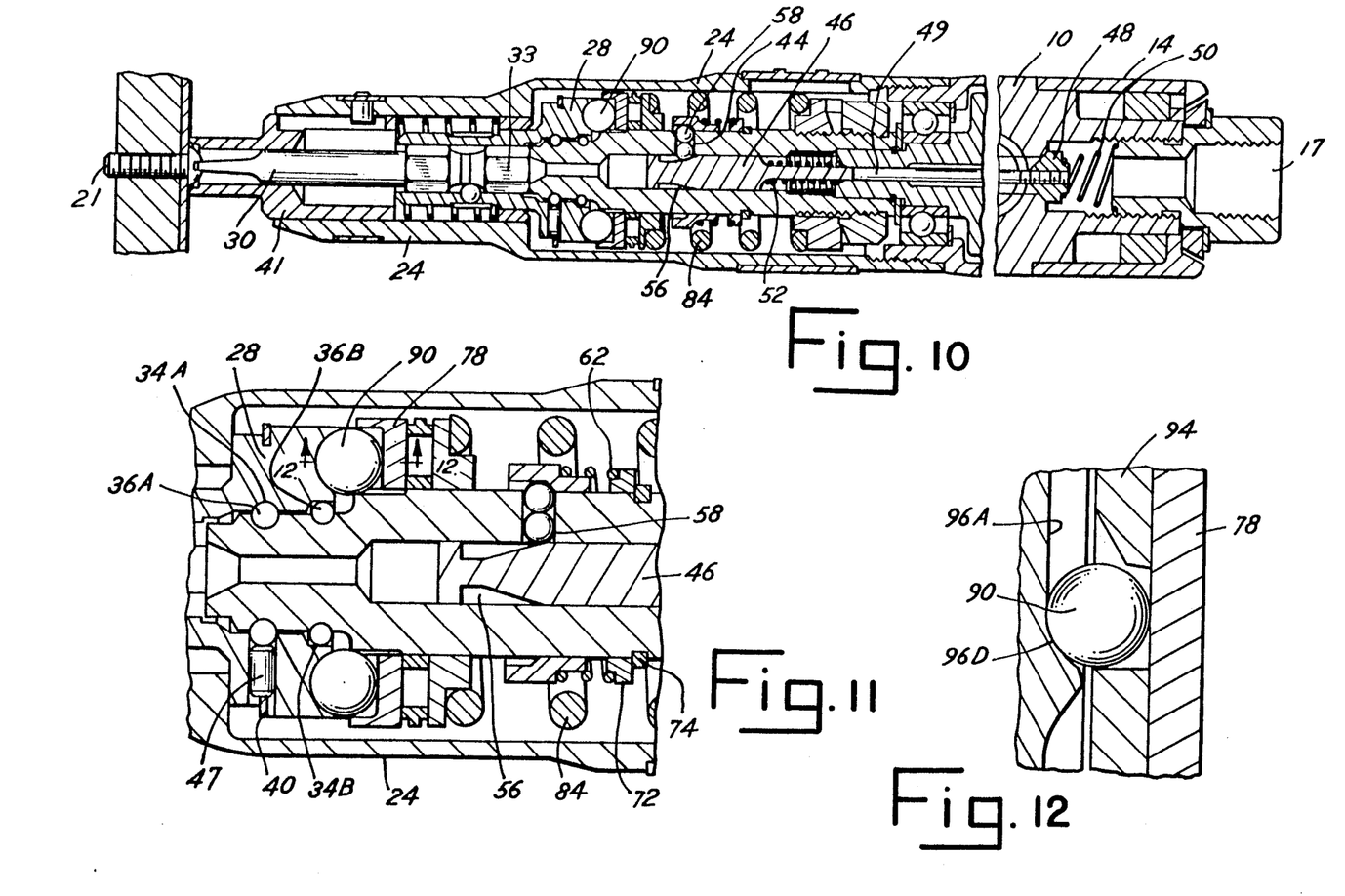
FIG. 10 is a longitudinal cross-sectional view of the tool prior to resetting of the valve for the rotary vane air motor.
FIG. 11 is an enlarged cross-sectional view showing the clutch mechanism and reset mechanism of FIG. 10.
FIG. 12 is an enlarged cross-sectional view showing the interaction of the roller members and bit holder as depicted in FIG. 11.

FIGS. 1, 2, 7 and 10 are longitudinal cross-sectional views of the invention as incorporated in a pneumatic screwdriver. FIG. 1 depicts the screwdriver having a bit 30 positioned above a fastener 21 prior to engagement with the fastener 21. FIG. 2 depicts engagement of bit 30 of the screwdriver with a fastener 21 to initiate operation of the screwdriver. FIG. 7 depicts the condition of the screwdriver after the fastener 21 has been screwed into some material and the reaction torque from the fastener reaches a predetermined or preset level to disengage the clutch. FIG. 10 depicts the condition of the screwdriver subsequent to termination of the flow of air to the air motor of the screwdriver.

The screwdriver includes a main body 10 having a rear housing 12 fixed to the main body 10. A fluid flow inlet fitting 14 is threadably attached to a threaded passage 15 at the rear end of the main body 10 and defines a fluid flow inlet 17 to the tool. The tool has an elongated center line axis 16 which runs the length of the tool and about which the component parts of the tool are generally symmetrical. The centerline axis 16 is the axis of rotation of a rotary vane, fluid driven motor (not shown) retained within the housing 10 having an output shaft 20. A forward tubular housing 24 is threadably attached to the forward end of the main body or housing 10 and encloses a separate bit holder 28 that cooperates with bit 30, in this instance a screwdriver bit. The forward housing 24 comprises a generally cylindrical tubular member which extends forwardly and co-axially with axis 16. The housing 24 includes a cylindrical passage of variable diameter which encloses or encompasses the components comprising the bit holder 28 and clutch mechanism components described below.

The bit holder 28 is internally connected with the motor output shaft 20 through the clutch mechanism and is rotatable as well as axially movable with respect to the housing 24. Note, the output shaft 20 may be a direct output of the air motor or it may comprise the output shaft of a transmission interposed intermediate an air motor output shaft and the drive shaft 20. In any event, an output shaft 20 derives its power from the air motor.

A central passage 18 extends through the housing 10 and through all of the components comprising the air motor, transmission, and output shaft 20. The end of the bore 18 adjacent the motor and connecting for the motor has a sufficient diameter to define an axial air flow passage to connecting the fluid flow inlet 17 to the air motor (not shown) within the body 10 so as to power or operate the motor.

The output shaft 20, whether directly extending from the motor or from an intermediate transmission, is mounted in bearings 22 supported within the internal diameter of the housing or body 10. Thus, the output shaft 20 is driven about the axis 16. An annular bearing 26 is retained on the inside of the housing 24 axially forward of bearings 22. Bearing 26 cooperates with the forward cylindrical outside surface of the bit holder 28 A spindle 32 connects shaft 20 to bitholder 28. Thus, both the bit holder 28 and spindle 32 may be rotated within housing 24 and may also be translated axially with respect to the housing 24.

The bit holder 28 includes a forward keyed passage 31 for receipt of the bit 30. In the embodiment depicted the bit 30 includes an hexagonal cross section end 33 which is compatibly and slidably received in the hexagonal cross section passage 31 so that the bit 30 can be slidably inserted and slidably removed from the holder 28. The bit 30 includes an annular neck 35 which receives a ball bearing 37 retained in a radial passage in the bitholder 28 by a spring 39. The hexagonal end 33 of bit 30 insures that the bit holder 28 and bit 30 will simultaneously rotate.

A protective bit support shield or cover 41 is slidably retained within the nose of the housing 24. The cover 41 is biased by a spring 43 interposed between the cover 41 and the bearing 26 so that the cover 41 is biased axially forwardly. The cover 41 is retained by a spring biased pin 45 that extends through the nose of the housing 24 and engages in an axial slot 47 in the cover 41.

Intermediate the bit holder 28 and the output shaft 20 of the air motor is the clutch mechanism of the reset assembly and torque control mechanism of the invention. The clutch mechanism includes the driving clutch member or spindle 32 which is keyed to the shaft 20 (and thus driven by the air motor) at one end and which drivingly engages the bit holder 28 at its opposite end. The bit holder 28 and driving clutch member or spindle 32 are axially translatable along the axis 16 co-jointly and also rotate together or co-jointly except when decoupled as described below. The clutch member or spindle 32 thus includes first and second circumferential grooves 34A, 34B on the outside cylindrical surface of its forward end which receive ball bearings 36A, 36B retained on the inner counterbore end of the bit holder 28. The cooperative interaction of two sets of bearings 36A, 36B with the axially spaced parallel grooves 34A, 34B defined on the outside surface of the driving clutch member 32 serve to maintain the bit holder 28 and driving clutch member 32 in an aligned axial position in a more efficient and improved manner relative to the tool disclosed in U.S. Pat. No. 4,880,064. Thus, the ball bearing arrangement utilizing sets of ball bearings 36A, 36B tends to reduce tipping of the bit holder 28 with respect to the spindle or driving clutch member 32 caused by variations of operator technique such as angular attack upon the fastener 21. This is an important improvement of the present invention. This feature is especially helpful in reducing variation in output torque at low clutch settings, and is independent of the main spring 84 in keeping the bit holder 28 and spindle 32 in alignment. Note, the ball bearings 36 are retained in position by a pin 47 and spring clip 40.

As previously stated the clutch member 32 and bit holder 28 may move co-jointly in the axial direction from the position depicted in FIG. 1 to the position shown in FIG. 2, for example, in response to axial force imparted to a bit 30 which is engaged against a fastener 21. The opposite end of the clutch member 32 thus includes a counterbore 42 which slidably receives the drive shaft 20. The drive shaft 20 is keyed to the counterbore 42, for example, by virtue of the counterbore and shaft each having a compatible, hexagonal cross-section shape. The counterbore 42 extends axially from the end of the spindle or driving clutch member 32 in a series of reduced diameter sections as depicted in the FIGURES. The counterbore 42 connects with one or more radial passages or transverse passage 44 through the spindle or clutch member 32. Multiple passages 44 provided in spindle 32 are spaced from each other like spokes on a wheel. A valve rod 46 having a cylindrical shape of varying diameter is slidably received in the bore 42. The rod 46 interacts with a separate valve stem 49 associated with a valve member 48 that cooperates with a seat 48A in the central passage 18. The valve member 48 is normally seated due to engagement by a coil spring 50 which is compressed between the inlet fitting 14 on one side and the valve member 48 on the other side. The valve stem 49 extends axially through the central passage 18 and through the output shaft 20 to engage against the valve rod 46.

A second coil spring 53 is interposed between the end of the output shaft 20 and a land 54 on the inside counterbore 42 so as to bias the spindle 32 forward. Thus, spring 53 tends to axially displace the assembly comprising the spindle 32 and bit holder 28 to the left in FIGS. An additional coil spring 52 is compressed between the end of the output shaft 20 and a valve rod 46. Springs 52 and 53 normally maintain the spindle 32 and bit holder 38 in the extended configuration of FIG. 1. Spring 53 is compressed by a manual or mechanical force placed against the bit 30 when the bit is engaged with a fastener 21 as in FIG. 2.

Figure 8:
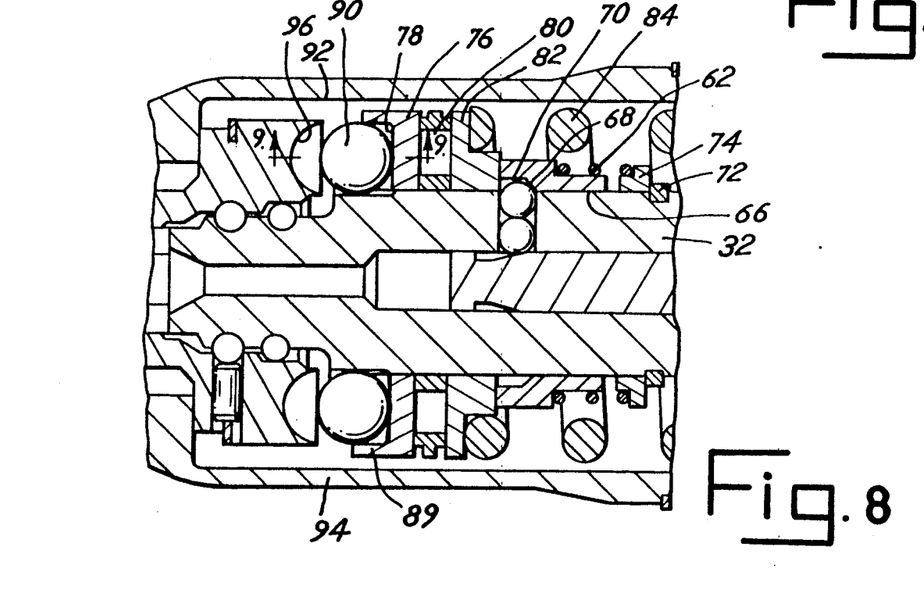
FIG. 8 is an enlarged longitudinal cross-sectional view of the clutch mechanism depicted in FIG. 7.

The valve rod 46 includes a tapered circumferential groove 56 which is positioned generally opposite the transverse or radial passage 44. Two small ball bearings 58 fit within each passage 44 and are held against the tapered groove 56 by means of an annular collar 60 on spindle 32 which is biased by a spring 62 to the left in the FIGURES. When the screwdriver or tool is in its rest position ready for initiation of operation the position of the collar 60 is as depicted in FIG. 1. The sleeve or collar 60 includes an inside cylindrical surface 66 (as shown in FIG. 8), which acts as a limiting surface with respect to movement of the ball bearings 58 in the radial outward direction. The surface 66 is connected via an inclined surface 68 to a second, larger diameter, circumferential limiting surface 70, again as depicted in FIG. 8. The spring 62 is retained in position on the outside of the spindle 32 by means of retaining ring 72 which cooperates with a retention collar 74 in a groove in spindle 32 again as depicted in FIG. 8.

A slidable washer 76 is also retained on the outside of the spindle 32. The slidable washer 76 includes a generally planar, annular bearing surface 78 against which roller bearings, 80 are retained by means of a pilot washer 82. This assembly is biased to the left as depicted by the FIGURES by a coil spring 84 which fits over the entire spindle 32. The coil spring 84 is adjustably biased against the pilot washer 82 by means of a nut 86 which is threaded onto the outside of spindle 32 and acts against a spring retaining member 88. Ball bearings 90 are retained in radial slots or passages 92 by collar 89 of washer 76 defined in a radial flange 94 of the spindle 32. The ball bearings 90 extend into shaped pockets 96 which are radially spaced from the axis 16 in the face of the bit holder 28. Normally, the ball bearings 90 will bottom out in the pockets 96.

Figure 6:
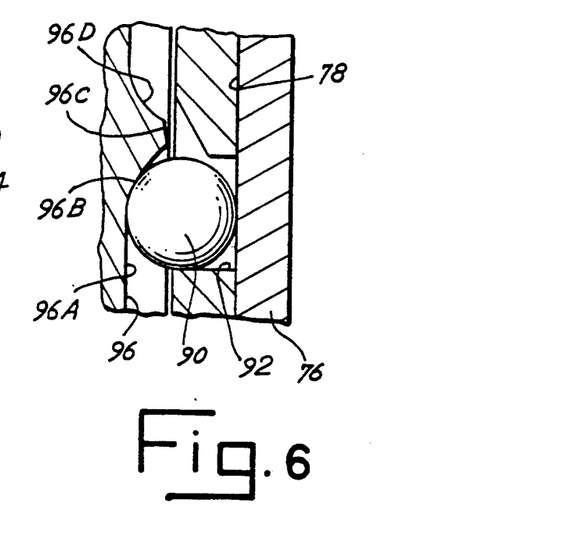
FIG. 6 is an enlarged cross-sectional view depicting the cooperative interaction of the roller members and the ramp construction in the clutch mechanism.

The configuration of the pockets 96 is an important aspect of the invention. FIGS. 6 and 12 depict the cross sectional configuration of the pockets 96 in greater detail since these FIGURES depict an arcuate side cross-sectional view of each of the pockets 96. Thus, each pocket 96 associated with a ball bearing 90 includes a generally planar base section 96a which connects with an upwardly extending ramp 96b. The ramp at 96b is preferably inclined at an angle in the range of about 25° to 45° from a plane that is perpendicular to the axis 16. The ramp 96b extends from section 96a in the direction of normal rotation of the tool as it is being used for a fastening operation. For example, a typical screwdriver will rotate in the clockwise sense. Thus the ramp 96b will be directed in the clockwise sense. Ball bearing 90 come to rest against its associated that ramp 96b during operation of the tool. The ramp 96b extends upwardly to the generally planar surface of the end of the bit holder 28. The ramp 96b then terminates with a slightly downwardly incline, backside ramp section surface 96c (FIG. 6) and then into the backside, curved surface 96d of the next adjacent pocket 96. The curved surface 96d as depicted in FIG. 12 has a radius of curvature which is slightly greater than the radius of the ball bearing 90. Of course, the construction of the ramp 96 may be reversed in direction in a counterclockwise operating tool.

Operation

The drawing and in particular FIGS. 1, 2, 7 and 10 depict the sequence of operation of the mechanism of the invention. FIG. 1 depicts the tool in the rest or reset condition prior to fitting or positioning the tool against the threaded fastener 21. FIG. 2 shows the tool during the tightening down operation on a fastener 21 after the bit 30 has been pressed against the fastener to open the valve 48. FIG. 7 shows the clutch mechanism responding to torque transmitted from the air motor just prior to shut-off or closure of valve 48. FIG. 10 shows the clutch after tool shut-off and prior to being reset.

Initially high pressure air enters the inlet fitting 14 and flows through the passage 16 to the valve member 48. Valve 48 is actuated or opened by engaging the bit 30 with the fastener 21 to thereby translate the bit 30, bit holder 28, spindle 32, valve rod 46 and thus rod 49 to the right from the position shown in FIG. 1 to the position shown in FIG. 2. This opens the valve 48 permitting air flow to the air motor. Note, in this circumstance, the biasing force of springs 50, 52 and 53 is initially overcome. In addition, the bearings 44 act against tapered groove 56 and preclude the valve rod 42 from moving and thus the rod 49 is extended to the position shown in FIG. 2, thereby opening the valve 48.

When the valve 48 opens, the motor is allowed to operate and rotation and torque is transmitted through the output shaft 20, the spindle 32, ball bearings 90 and bit holder 28 to the bit 30. The balls 90 are engaged against the inclined surface 96b as depicted in FIG. 6 during the operation of the screwdriver so long as the torque required to turn the fastener 21 does not exceed a threshold level which is dependent upon the spring force associated with the adjustable spring 84. As torque transmitted to the bit holder 30 is increasingly resisted by the reactionary torque from the fastener 21, the balls 90 roll up the ramps 96b. When the axial component of the normal force applied to the balls by the ramps 96b surpasses the biased load applied to the balls 90 by the spring 84, the balls 90 begin to move upward on the ramps 96b. The ramping of the balls 90 results in the rearward motion of the race assembly defined by the washer 76, roller bearings 80 and sleeve 82. As this occurs, there is a point at which the sleeve 82 moves the collar 60 to the right in the FIGURES. When the collar 60 is sufficiently moved to the right the force of the spring 50 on rod 49 and valve rod 56, springs 52 or rod 46 causes the valve rod 46 and more particularly tapered groove 56 to engage the ball members 58. The ball members 58 then ride outwardly in the radial opening or passages 44 against the surface 68 and then against the surface 70. This motion permits the rods 46 and 49 to be released and the valve member 48 to close on seat 48A. This occurs upon the reaching of a threshold torque which permits adequate ramping of the balls 90 up the ramp 96b.

Note, as long as the pressurized air is supplied to the air motor, however, an increasing amount of torque will be transmitted through the balls 90 to the bit holder 28. This increase in torque occurs until the balls 90 approach the top of the ramps 96b at which time the valve 48 is closed as described previously. After the motor is shut-off, one of two possible outcomes will occur. Either there will be enough residual kinetic energy in the rotating motor and gearing parts to cause the balls 90 to roll over the top of the ramp 96b and over the top surface 96c into the next adjacent recess 96. Alternatively, there will not be enough kinetic energy to allow the balls 90 to roll upward and over surface 96c. They will then roll back to the bottom of surface 96a. In either event, the valve 48 will be closed.

Figure 9:
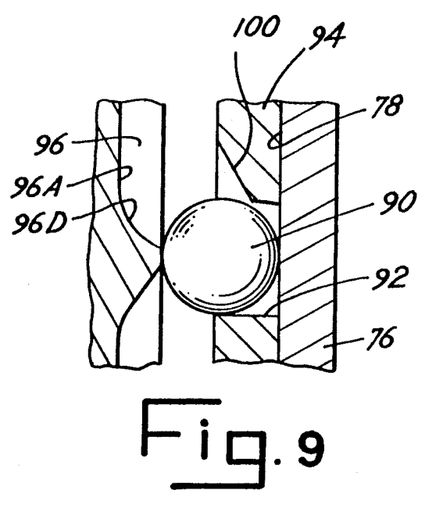
FIG. 9 is an enlarged cross-sectional view of the interaction of the roller members and the bit holder in the configuration depicted in FIG. 8.

When the direction of the motor is reversed, for example, when unseating a fastener, it is desirable to disable the shut-off feature of the clutch and thereby use a full stall torque of the motor for operation in reverse. This ensures that any fastener seated by a tool can be unseated without making an adjustment to the clutch, i.e., via nut 86. This is accomplished by putting an angle 100 (FIG. 9) on the backside of the slot 92 which permits an increased amount of torque to be imparted by the motor to the bit holder 28 in reverse operation. This is accomplished in conjunction with the surface 96d which is generally compatible (i.e., of similar radius) with the spherical surface associated with the ball bearing 90. Thus, the additional axial component of force to overcome and move the balls 90 upward on the surface 96d is such that it is greater than the torque associated with the surface 96b when the tool is operated in the forward direction. By appropriately controlling the shapes of the surfaces 96b, 96d and angle 100 it is possible to control with great certainty the characteristics of the operation of the tool in both the forward and reverse directions.

An additional feature of this design is spring 52, which applies a consistent force against rod or shaft 46. This diminishes the variation, due to roughness and lack of straightness of the push rod 49, so often encountered, in the final torque achieved by the tool.

Variations in the construction may be made without departing from the spirit and scope of the invention. For example, the tool disclosed utilizes six (6) bearings 90 associated with six (6) pockets 96 equally and radially spaced about axis 16. A different number of associated bearings 90 and pockets 96 may be used. The configuration of the pockets 96 may be varied and the configuration of the pockets 96 may vary from pocket to pocket. The dual race bearings 36A, 36B may be supplemented by one or more races. Thus, while there has been set forth the preferred embodiment of the invention, it is to be understood that the invention has to be limited only by the following claims and their equivalents.

What is claimed is:

1. In a fluid powered tool of the type including a housing with a forward end, and intermediate section and a rear end, a fluid driven motor in the housing with a rotary output shaft defining an axis of rotation, a fluid inlet to the motor, a valve member cooperative with the fluid inlet to control fluid flow to the motor, a bit holder for a tool bit at the forward end of the tool and a clutch mechanism intermediate section and connecting the output shaft with the bit holder, the output shaft, bit holder and clutch mechanism being substantially coaxial, the improvement comprising, in combination:

a torque responsive, fluid flow start, shut-off and reset mechanism incorporated in the clutch mechanism, said torque responsive mechanism including:

(a) means for support of the bit holder in the housing to permit both rotary and axial movement;

(b) a driving clutch member keyed at one end to the output shaft for simultaneous rotation with the output shaft and attached at its opposite end to the bit holder to permit simultaneous axial movement with the bit holder and independent rotary movement relative to the bit holder;

(c) clutch engaging means for mechanically connecting the driving clutch member to the bit holder for simultaneous rotary movement, said means including at least one biased roller member intermediate the clutch member and the bit holder, said roller member radially spaced from the axis of rotation and axially movable with respect to one of the driving clutch member and bit holder, said roller member biased by roller member biasing means into a receiving pocket of the other of the driving clutch member and bit holder during rotary driving operation of the tool below a torque threshold, said roller member axially translatable from said receiving pocket during driving operation of the tool above said torque threshold whereby the bit holder and driving clutch member rotationally disengage;

(d) an axial counterbore in the driving clutch member extending from the motor output shaft;

(e) a valve control rod in the counterbore having a forward end and mechanically connected at the other end to the valve member;

(f) valve control rod biasing means for axially biasing the valve member and the valve control rod toward a valve member closed position;

(g) driving clutch member biasing means in the axial counterbore of the driving clutch member for biasing the driving clutch member axially toward the forward end relative to the output shaft;

(h) a radial passage in the driving clutch member intersecting the counterbore;

(i) a radially displaceable member in the radial passage cooperative with the forward end of the valve control rod;

(j) an axially displaceable sleeve over the driving clutch member radial passage, said displaceable sleeve having first and second radial limiting means both cooperative with the radially displaceable member to control the position of said radially displaceable member in the radial passage to thereby control the axial position of the valve control rod in the counterbore;

(k) sleeve biasing means for normally biasing the sleeve to a first radial limiting position corresponding to engagement with the first radial limiting means wherein the valve control rod is extended axially toward a valve open position; and (l) either the bit holder or the clutch member including a transverse face with said pocket defined therein and the other of the bit holder and the clutch member including an axial passage for receipt and retention of the roller member, in opposed relation to said pocket said pocket having a shaped configuration with a planar section, an inclined ramp section for cooperation with the roller, the inclined ramp section inclined at an angle in the range of 25° to 45° with respect to a plane transverse to the axis of rotation and in the direction of rotation of the tool when driving a fastener, said ramp section terminating with an inclined backside ramp section inclined in the opposite sense from the inclined ramp section, and thence a curved surface of the next adjacent pocket;

whereby to start the motor by opening the valve member the bit holder is axially translated rearwardly against the force of the value control rod biasing means and the driving clutch member biasing means as the driving clutch member and bit holder are rotationally engaged, and the sleeve is in the first limiting position to hold the valve control rod in the rearward position and cause the valve member to open;

whereby to control torque the rotatably connected driving clutch member and bit holder are disengaged when the torque threshold is exceeded and the roller member is axially translated rearwardly against the force of the ball members biasing means to simultaneously translate the sleeve to the second limiting position thereby permitting the radially displaceable member to move radially outward in the passage and release the control rod for movement toward the forward end and close the valve member to terminate operation of the motor; and whereby to reset the mechanism, release of axial force on the bit holder permits the bit holder and shaft to move axially forward in response to drive clutch member biasing means and the sleeve biasing means to effect subsequent radial movement of the radially displaceable member to the first limiting position.

2. The improvement of claim 1 wherein the sleeve is axially driven by the roller member in the rearward end direction and by sleeve biasing means in the forward end direction.

3. The improvement of claim 2 wherein the roller member biasing means is adjustable.

4. The improvement of claim 2 wherein the sleeve biasing means and the roller biasing means comprise coaxial spiral spring members fitted over the driving clutch member.

5. The improvement of claim 4 wherein the means for biasing the roller member is adjustable.

6. The improvement of claim 1 wherein the section opposite the ramp section at the opposite end of the pocket for cooperation with a roller which ramp section is configured to require a higher amount of torque to move the roller axially along the ramp by having a radius of curvature greater than the radius of the roller member.

7. The improvement of claim 6 wherein the axial passage in the bit holder or clutch member comprises a radial slot having one side thereof cut at an angle to increase necessary torque to separate the bit holder and clutch member upon reversal of the tool.

8. The improvement of claim 1 including a first bearing connection of the bit holder and clutch member and a second bearing connection of the bit holder and clutch member, said first and second bearing connection being spaced for maintaining said bit holder and clutch member axially connected, aligned and rotatable with respect to each other.

9. The improvement of claim 1 wherein the valve control rod comprises a segmented valve control rod and also wherein the valve control rod biasing means includes a first spring (50) for biasing the rod and valve member (48) toward the closed position and a second spring (53) for biasing a separate segment (46) of the rod including the forward end of the rod.

* * * * *